United States Patent [19]
Ford et al.

[11] Patent Number: 5,613,522
[45] Date of Patent: *Mar. 25, 1997

[54] SHAPED FABRIC PRODUCTS

[75] Inventors: Michael A. Ford, West Chester; Richard A. Barlow, Newtown Square, both of Pa.; Martin I. Jacobs, Bedford, N.H.

[73] Assignee: Bentley-Harris Inc., Exton, Pa.

[ * ] Notice: The term of this patent shall not extend beyond the expiration date of Pat. No. 5,413,149.

[21] Appl. No.: 549,456

[22] Filed: Oct. 27, 1995

Related U.S. Application Data

[60] Continuation-in-part of Ser. No. 418,076, Apr. 6, 1995, Pat. No. 5,556,495, which is a division of Ser. No. 787,900, Nov. 5, 1991, Pat. No. 5,413,149.

[51] Int. Cl.$^6$ .................................................. F16L 11/00
[52] U.S. Cl. .................... 138/123; 138/110; 138/128; 138/103; 428/35.1; 428/36.1
[58] Field of Search .................................. 138/123, 110, 138/124–126, 128, 119, 129, 103; 428/36.1, 36.3, 35.1

[56] References Cited

U.S. PATENT DOCUMENTS

| | | | |
|---|---|---|---|
| 150,481 | 5/1874 | Chaffee | 138/126 |
| 603,230 | 4/1898 | Bergmann | 269/210 |
| 1,285,138 | 11/1918 | Hansen | 138/124 |
| 1,947,924 | 2/1934 | Sery | 96/7 |
| 3,011,527 | 12/1961 | Corbiere | 139/387 |
| 3,093,160 | 6/1963 | Boggs | 138/125 |
| 3,391,422 | 7/1968 | Boggs | 18/4 |
| 3,502,113 | 3/1970 | Bjorksten | 138/129 |
| 3,669,157 | 6/1972 | Woodall, Jr. et al. | 139/387 |
| 3,970,116 | 7/1976 | Takada et al. | 139/387 R |
| 4,015,641 | 7/1977 | Goff, Jr. et al. | 139/384 R |
| 4,181,157 | 1/1980 | DeCamp | 138/126 |
| 4,228,824 | 10/1980 | Evans et al. | 138/119 |
| 4,308,896 | 1/1982 | Davis | 138/125 |
| 4,463,779 | 8/1984 | Wink et al. | 138/125 |
| 4,652,263 | 3/1987 | Herweck et al. | 623/1 |
| 4,741,087 | 5/1988 | Plummer, Jr. | 138/123 |
| 4,754,685 | 7/1988 | Kite et al. | 138/123 X |
| 4,777,859 | 10/1988 | Plummer, Jr. | 87/7 |
| 4,870,887 | 10/1989 | Tresslar et al. | 87/9 |
| 4,929,478 | 5/1990 | Conaghan et al. | 428/35.1 |
| 4,946,722 | 8/1990 | Moyer | 428/36.1 |
| 5,027,988 | 7/1991 | Corbiere | 223/28 |
| 5,057,092 | 10/1991 | Webster, Jr. et al. | 604/282 |
| 5,229,176 | 7/1993 | Freeman | 428/36.1 X |
| 5,343,776 | 9/1994 | Falco et al. | 428/36.1 X |
| 5,413,149 | 5/1995 | Ford et al. | 138/123 |

FOREIGN PATENT DOCUMENTS 2045383 10/1980 United Kingdom.
2117418 10/1983 United Kingdom.

*Primary Examiner*—David Scherbel
*Assistant Examiner*—Patrick F. Brinson
*Attorney, Agent, or Firm*—Synnestvedt & Lechner

[57] ABSTRACT

Disclosed are flexible, kink-resistant shaped fabric products which are particularly well adapted for protecting and/or covering elongate substrates, such as cables, conduits, wiring and the like. The shaped fabric products include a wall portion comprising a filament resiliently set in a spiral configuration with respect to the longitudinal axis of the shaped product. The wall portion may also preferably comprise a filament in the form of circumferential hoops substantially conforming in shape and size to the cross-sectional configuration of the shaped product.

13 Claims, 1 Drawing Sheet

SHAPED FABRIC PRODUCTS

RELATED APPLICATION

This application is a continuation-in-part of U.S. Ser. No. 08/418,076, filed Apr. 6, 1995, now U.S. Pat. No. 5,556,495 which is a divisional of U.S. Ser. No. 07/787,900, filed Nov. 5, 1991, now U.S. Pat. No. 5,413,149, issued May 9, 1995.

FIELD OF THE INVENTION

The present invention is directed to tubular products and more particularly to tubular fabrics which are particularly well adapted for bundling and protecting elongated articles, such as wires, cables, hoses and conduits.

The use of fabric sleeves for encasing cables, hoses and other elongated flexible articles is well-known in the art. Examples of such sleeving are available from The Bentley-Harris Manufacturing Company under the registered trademark EXPANDO. The EXPANDO® sleeving is lightweight and provides tough physical protection for cable assemblies, wire harnesses and the like. The open construction of this type of product is of advantage over solid material in that it breathes and prevents the entrapment of moisture. In addition, this type of sleeving maintains the bundled, elongated articles in clean, compact condition.

While sleeving of the type employed by the EXPANDO® product has achieved significant success and possesses certain advantageous characteristics, a need for flexible, kink-resistant woven tubular products continues to exist. U.S. Pat. No. 4,228,824 to Evans et al, for example, recognizes the difficulty of providing woven tubular products which resist kinking when curved or bent. Evans et al teaches that this difficulty may be overcome by providing a hose having a reinforcement structure comprised of plied warp yarns formed of filaments of high modulus material which resists longitudinal extension of the hose. The warp elements of Evans et al are said to have a high degree of twist in the filaments in order to provide stability to the hose wall when compressed during curving of the hose. Furthermore, Evans et al illustrates the warp elements as extending along the length of the hose in a direction substantially parallel to the axis of the hose.

U.S. Pat. No. 4,652,263 to Herwick et al is directed to woven fabric tubes especially adapted for use as prostheses in biomedical applications. Herwick et al notes that such woven fabric tubes are preferably capable of returning to their original shape after being stretched, compressed or bent. Herwick et al also notes that such tubular products should also be resistant to kinking or radial collapse. Elasticity is imparted to the tubes of Herwick et al by providing the woven tubular products with axially-oriented warp threads forming loops extending radially outward between circumferential fill threads. The loops are set to return to the loop configuration upon release of tension applied axially to the tube.

U.S. Pat. No. 4,015,641 to Goff et al recognizes the difficulty associated with providing shape-retaining, woven tubular products. In particular, Goff et al notes that tubular fabrics have heretofore been filled with foam material so that the product will have a cushioned shape-retaining characteristic. Goff et al suggests that a similar effect can be obtained by forming a woven tubular product using monofilament filling yarns in both layers of the fabric and alternately and intermittently weaving monofilament warp yarns between the layers to connect the two layers together.

While the products mentioned above may have achieved some degree of success, they also possess certain drawbacks. For example, potentially costly and somewhat unusual manufacturing techniques are required to produce the products of the type described above. Moreover, the products described in Goff et al suffer from the disadvantage of requiring the presence of structural members spanning the hollow portion of the tubular product. The presence of such structural members limits the usefulness of the tubular product for encasing elongate substrates.

Thus, applicants have recognized a need for shaped fabric products and particularly for tubular fabrics, which are at once shape-retaining, kink-resistant and flexible. Furthermore, applicants have recognized the failure of the prior art to provide methods for manufacturing woven tubular products which possess these characteristics.

Furthermore, while the abrasion resistance of the heretofore used protective fabric coverings has been acceptable in many applications, applicants have found that tremendous improvement in abrasion resistance is possible. Such improvement in abrasion resistance is highly desirable for obvious reasons, such as increasing the useful life of the protective fabric cover.

Accordingly, it is an object of the present invention to provide improved methods of manufacture of flexible, kink-resistant fabric covers.

It is a further object of the present invention to provide relatively low-cost protective fabric covers.

It is yet a further object of the present invention to provide flexible, kink-resistant fabric covers with excellent abrasion resistance.

SUMMARY OF THE INVENTION

The present invention provides flexible, kink-resistant shaped fabric products which are particularly well adapted for protecting and/or covering elongate substrates, such as cables, conduits, wiring and the like. The shaped fabric products are preferably elongate tubular products having a longitudinal dimension which is substantially greater than the width, diameter or girth of the product. According to important aspects of the present invention, the shaped fabric products include a wall portion comprising a filament resiliently set in a spiral configuration with respect to the longitudinal axis of the shaped product. Applicants have found that tubular products comprising fabrics and preferably woven fabrics having such spirally set filaments generally possess excellent flexibility and exceptional kink- and abrasion-resistance.

The wall portion of the tubular product also preferably comprises a filament in the form of circumferential hoops substantially conforming in shape and size to the cross-sectional configuration of the shaped product. For the preferred cylindrically shaped tubular products, the circumferential hoops are substantially circular hoops having a diameter equal to about the diameter of the cylinder.

According to preferred aspects of the present invention, the shaped fabric product comprises a woven tubular fabric having a fill end thereof in the form of hoops which lie in a plane substantially perpendicular to the axis of the tube and warp ends thereof resiliently set in a spiral configuration with respect to the longitudinal axis of the tube.

The present invention also provides methods of forming flexible, kink-resistant tubular fabrics. The methods comprise: (1) providing a shaped fabric product comprising a wall portion comprising interlaced, resiliently settable filaments; and (2) resiliently setting at least a portion of the resiliently settable filaments in a spiral configuration with respect to the longitudinal axis of the tubular product. According to certain preferred embodiments, the providing step comprises providing a woven tubular fabric and the setting step comprises heat setting the resiliently settable filaments.

DETAILED DESCRIPTION OF PREFERRED EMBODIMENTS

Figure 1:
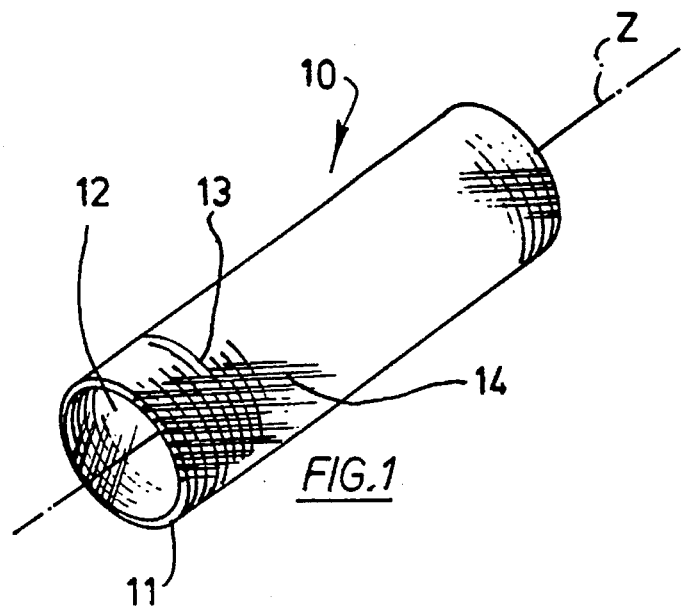
FIG. 1 is a perspective view of a woven tubular product according to a first embodiment of the present invention.

The present invention is directed to shaped products and more particularly, to the making of shaped fabric products As the term is used herein, "fabric" refers to any material comprised of interlaced filamentary components. As will be appreciated by those skilled in the art, many classes of fabric material exist, and it is contemplated that all such materials may be adaptable for use in connection with the present invention. In particular, it is contemplated that the shaped fabric products may comprise knitted products, braided products or woven products, with woven products being preferred. The preferred woven products comprise fill and warp threads interlaced according to any one of the well-known weave patterns. In general, however, applicants have found that a twill pattern, and preferably a 2—2 twill pattern, produces acceptable results.

Furthermore, it is generally preferred that the shaped fabric products are preferably characterized by an open construction. That is, it is generally preferred that the filamentary materials comprising the wall portion of the shaped fabric are relatively loosely interlaced. In this way, the shaped fabric products of the present invention breath and prevent entrapment of moisture.

The present shaped fabric products are particularly well adapted for protecting and/or covering substrates, especially elongate substrates. The particular shape of the present fabric will thus typically depend upon the shape of the substrate being covered or protected. In all cases, however, the shaped fabric product will provide a wall portion for covering the substrate and a chamber or open area internal to the wall portion for containing at least a portion of the substrate. Thus, the shaped fabric products will preferably possess a hollow portion defined by a wall portion having a shape corresponding generally to the shape of the substrate to be protected, thereby providing a chamber or cavity for accepting the substrate. While all such shapes are within the scope of the present invention, it is contemplated that the shaped fabrics of the present invention will frequently and typically be in tubular form. As used herein, the term "tubular" refers to an elongate article having an internal chamber running substantially along the length thereof. While it is expected that the tubular products of the present invention will typically have a circular cross-sectional configuration, it is contemplated that other cross-sectional configurations, such as triangular, square and ellipsoidal, may also be used.

According to important aspects of the present invention, the shaped fabric products comprise filaments in the wall portion thereof resiliently set in a spiral configuration relative to the longitudinal axis of the shaped fabric. For embodiments comprising tubular products, for example, the fabric product includes filaments resiliently set in a spiral pattern with respect to the axis of the tube. As the term is used herein, "resilient set" refers to the incorporation of a permanent set or a bias in a resilient filamentary material. Thus, a filamentary material which has been resiliently set in a given configuration tends to remain in that configuration under ambient temperature conditions and in the absence of external stress. However, such material readily deforms upon the application of externally applied stress but returns to substantially its original "set" position upon the release of the stress.

It is contemplated that the pitch of the resiliently set spiral filaments may vary widely within the scope hereof, depending upon such factors as the particular filamentary material being used, the cost of the product and the degree of flexibility and kink-resistance which is desired. In general, however, it is preferred that for tubular fabric products, the resiliently set spiral filaments have a pitch of no greater than about 0.4 turns per longitudinal inch of tubular product. At a pitch of about 0.1 turns per inch, the advantages of the invention begin to be realized. At a pitch of about 0.125 turns per inch, the benefits of the invention were substantially and unexpectedly greater, the product so formed offering a level of abrasion resistance at least twice that of products having a pitch of 0.1 turns per inch and nearly as great as those having a pitch of 0.2 turns per inch. Accordingly, a preferred range of pitch angles for the resiliently set spiral filaments is from about 0.125 to about 0.3 turns per inch. Although certain advantages may be achieved with pitch angles above the preferred range, applicants have found that tubular fabric products, and especially woven tubular products having a circular cross-section and an inner diameter of from about 3/16 to about 4 inches, possess high levels of both flexibility and kink-resistance when the spiral filaments have a pitch within the range described herein. Furthermore, applicants have found that such tubular products possess an unexpectedly high degree of abrasion resistance.

According to preferred embodiments of the present invention, the shaped fabric products include a wall portion comprising filaments resiliently set in a spiral configuration relative to the longitudinal axis of the shaped fabric such that the tubular product has an abrasion resistance of at least about 20,000 cycles, preferably above 25,000 cycles and even more preferably of from about 30,000 to about 60,000 cycles of the ARP test. As the term is used herein, the "ARP test" refers to the abrasion test outlined hereinafter in the Example section of the present specification.

According to certain preferred aspects of the present invention, the wall portion of the shaped fabric product also comprises resiliently set circumferential hoops substantially conforming in shape and size to the cross-sectional configuration of the shaped product. As used herein, the term "cross-sectional configuration" refers to the configuration of a shaped product in a plane which is substantially normal with respect to the longitudinal axis of the product. For example, the wall portion of cylindrically-shaped tubular fabrics preferably includes resiliently set circular filaments forming hoops having approximately the diameter of the cylinder. According to especially preferred embodiments, the shaped product is a woven product in which a substantial portion of the fill threads, and even more preferably, substantially all of the fill threads are resiliently set in the form of circumferential hoops and wherein a substantial portion of the warp ends, and even more preferably, substantially all of the warp ends are resiliently set in a spiral configuration with respect to the longitudinal axis of the shaped product.

As is known to those skilled in the art, many filamentary materials of construction are capable of being provided with a resilient set. Thus, it is contemplated that a large number of materials are adaptable for use in forming the resiliently settable filaments hereof. For example, many structural metals and engineering plastics will assume a permanent set when stressed above their elastic limit at room temperature. In general, however, it is expected that the filamentary material of the present invention will be provided with a resilient set or bias by the application of heat, pressure, irradiation, chemical reagents and combinations of these.

While it is contemplated that metals and natural fibers may be used for the resiliently settable filaments hereof, it is generally preferred that such filaments comprise synthetic fibers and, even more preferably, synthetic fibers constructed from the class of materials known as thermoplastic resins. In general, thermoplastic resins are polymeric materials that soften or melt at elevated temperatures, thus allowing them to be processed into shapes and products that, when cooled, recover the physical and chemical properties of the original resin. In addition, this class of materials generally has a good balance of high tensile properties, compressive and shear strength, as well as impact resistance. Exemplary thermoplastic resins are polyamides, polyesters and polyolefins, with polyamides and polyesters being preferred.

Filaments comprised of thermoplastic resins of the type described may be cause to take a resilient, permanent set by forming a product comprised of the plastic material to a specific geometry, for example, a circular or spiral shape, and then modifying the properties of the material. As mentioned above, this is usually accomplished by the application of heat to raise its temperature to a point either above the glass transition temperature or above the softening point. The shaped product is then cooled so as to recrystallize or set the filamentary material. The product thereafter has a resilient set or bias (sometimes called an "elastic memory") in the shape in which it was formed, as is well recognized by those of ordinary skill in the art. Although the application of heat is the usual and most widely employed method of producing the set or bias, it should also be recognized that other, e.g., chemical or physical, methods may sometimes be employed. For example, such a set may be provided to filamentary material comprising polyethylene by irradiating the shaped product so as to cross-link the polyethylene chains. Such cross-linking may be accelerated or enhanced by the inclusion of cross-linking promoters in the polymeric material.

It is contemplated that the resiliently settable filaments used in the fabrics of the present invention may vary widely both as to type and dimension. In particular, it is contemplated that the resiliently settable filaments may include multifilament yarns and threads, monofilament yarns and threads or mixtures of these types of filaments, with monofilaments being preferred.

It will be appreciated that filamentary material other than the resiliently settable material described above may be included with advantage in the shaped fabrics of the present invention. For example, it may be beneficial to include filaments comprised of fluorocarbon polymer resin to impart low friction characteristics to the shaped products. Moreover, combinations of engineering plastic materials and yarns or strands or filaments comprised of metals or mineral materials may be used. Thus, it is contemplated that the present fabrics may comprise, in addition to the resiliently settable filaments hereof, other natural and synthetic filaments which contribute but do not detract from the properties of the present shaped products.

A first embodiment of shaped fabric product of the present invention will now be described in connection with FIGS. 1 and 2. The shaped fabric product, designated generally as 10, comprises a woven tubular product having a circular cross-section. The tubular product comprises a wall portion 11 forming a hollow chamber 12. In use, the hollow chamber 12 is filled by an elongate substrate which is to be protected by the shaped fabric 10. Wall portion 11 of shaped product 10 comprises fill ends 13 interlaced with warp ends 14. Fill ends 13 are in the shape of circular hoops or bands having a diameter equivalent to about the diameter of the wall portion 11 of tubular product 10. Warp ends 14 are resiliently set in a spiral configuration with respect to the longitudinal axis z of tubular product 10.

Figure 2:
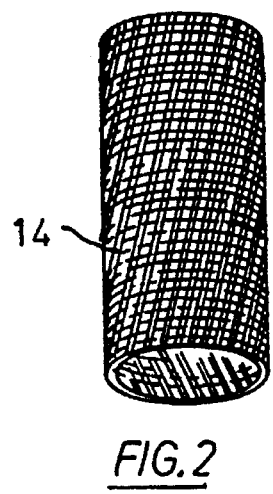
FIG. 2 is a plan view of a woven tubular product according to a first embodiment of the present invention.

It will be appreciated that numerous and varied methods may be employed to obtain a tubular product of the type disclosed in FIGS. 1 and 2, and the use of all such methods is within the scope hereof. According to the method aspects of the present invention, however, the tubular product is constructed by first providing a woven tubular product in which the fill ends lie in a plane which is substantially perpendicular to the axis of the tube and in which the warp ends lie in a plane which is substantially parallel to the axis of the tube. Numerous techniques are available for providing such a product and all such techniques are within the scope hereof. For example, such a tubular product may be provided by first providing a rectangular sheet of woven fabric in which the fill ends are substantially parallel to the short edge of the sheet, and the warp ends are substantially parallel to the long edge of the woven sheet. The long edges of this woven rectangular sheet are then joined according to any one of several well-known techniques, such as sewing, to form a woven product which is continuous along its short edge. It will be appreciated that other methods and techniques are known and available for forming woven fabrics which are continuous along their short edge. For example, certain weaving equipment, such as narrow fabric needle looms, are readily adapted to produce such woven products. The woven products can then be formed into a tubular configuration by, for example, placing the product over a cylindrical mandrel.

It will be appreciated that the formation of tubular products using narrow fabric needle looms as indicated herein produces woven tubular products in which a single fill end is knitted to itself to form interconnected resilient hoops disposed in a plane which is substantially perpendicular to the axis of the tube.

The methods of the present invention further comprise resiliently setting the warp ends of the provided tubular product in a spiral configuration relative to the axis of the tube. This step preferably comprises rotating a first portion of the tubular product about its longitudinal axis while preventing a second portion of the tubular product from rotating. In this way, the warp ends of the woven product are twisted into a spiral configuration with respect to the axis of the tube. Once in the spiral configuration, the warp ends may be resiliently set according to techniques of the type described above to retain the spiral configuration. According to especially preferred embodiments, the fill ends 13 are also comprised of resiliently settable material, and the step of resiliently setting the warp ends in the spiral configuration will also provide the preferred step of resiliently setting the fill ends in the form of a circular hoop.

Figure 3:
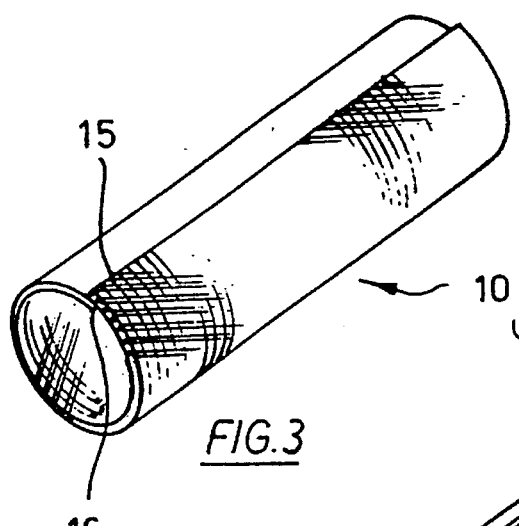
FIG. 3 is a perspective view of a woven tubular product which is radially discontinuous according to a second embodiment of the present invention.
Figure 4:
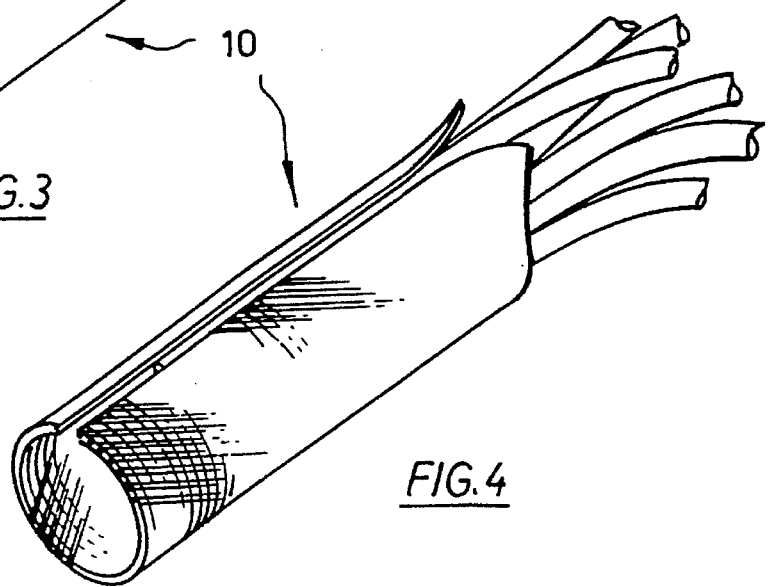
FIG. 4 is a perspective view of a radially discontinuous woven tubular product of the present invention encasing an elongate substrate.

The present invention is not limited to continuous tubular products of the type illustrated in FIG. 1. For example, a second embodiment of the present invention provides tubular products which are discontinuous in the circumferential direction as illustrated in FIG. 3. It will be appreciated by those skilled in the art that tubular products of the present invention which are discontinuous in the circumferential direction have certain advantages, especially when the wall portion of the tubular product includes resiliently set fill ends in the form of hoops or bands. For example, the discontinuity imparted to products of the type illustrated in FIG. 3 permits the tubular product to be readily opened in the circumferential direction, thereby providing easy assembly of the protective cover around the substrate to be protected. Furthermore, because of the resiliently set circumferential hoops provided by fill ends 13, such a tubular product will return resiliently to its relatively closed configuration, thereby providing protection to the enclosed substrate, as illustrated in FIG. 4.

It will be appreciated that tubular products which are discontinuous in the circumferential direction may be prepared according to various techniques and all such techniques are within the scope of the present invention. For example, tubular products of the type disclosed in FIG. 3 may be prepared by providing a longitudinal cut or slit in the wall portion 12 of the tubular product, thereby producing a tubular product having adjacent longitudinal edges. While such a cut or slit will provide the advantages described above, it may also have disadvantages in some applications. For example, the simple provision of a cut or a slit longitudinally of the tube may leave a small gap or opening in the tube wall. This small gap or opening may be a disadvantage for applications which require that the enclosed substrate be completely mechanically isolated from the environment. According to certain embodiments of the present invention, therefore, it is preferred that the longitudinal edges 15 and 16 of the discontinuous tubular product overlap one another in the radial direction, as illustrated in FIG. 3. This overlap may be provided using any one of several processing techniques. In general, however, it is contemplated that the tubular product will be radially compressed so as to provide overlap between edges 15 and 16 and subsequently heat set in this compressed position. For example, the discontinuous tubular product may be provided to a folder of well known design and heated, preferably simultaneously heated, to provide edges 15 and 16 in a heat set, overlapped position. As an alternative example, the discontinuous tubular product may be wrapped around a mandrel having a diameter smaller than the inner diameter of the discontinuous tube such that overlap of the longitudinal edges occurs. The overlapped configuration is then set into the tube, such as by the application of heat to the mandrel.

While it is contemplated that the tubular products of the present invention may be provided in a wide variety of shapes and sizes, it is generally preferred that tubular products are substantially circular in cross-section and have an inner diameter of about 0.25 inch to about 4 inches. Furthermore, it is generally preferred that the warp and fill threads of the present invention are monofilaments having a diameter of from about 5 to about 15 mils with about 8 to about 10 mils being preferred.

Shaped fabric products, particularly tubular fabrics for use in casing and covering elongated substrates, according to the present invention exhibit exceptional and altogether unexpected results. For example, one important characteristic of the shaped articles of the present invention is the excellent abrasion resistance thereof. The following examples, which are set forth by way of illustration but not by way of limitation, describe the improvements in abrasion resistance which are achieved according to the present invention as compared to typical prior art products. In each of the examples which follows, abrasion tests were performed utilizing established standard test criteria for the evaluation of chaff guards intended to protect from abrasion and chaffing of hose assemblies and adjacent components, as set forth by the Society of Automotive Engineers, Inc. according to "Aerospace Recommended Practice" (ARP 15-36A), issued December 1978, revised February 1981, which are incorporated herein by reference. In particular, each tubular fabric being tested was installed over a stainless steel mandrel approximately 15 inches long. The mandrel and tubular product were restrained by suitable clamps and fittings according to the specified criteria. The tests were operated under ambient temperature conditions. An abrasive element comprising a 0.50 inch precision ground drill rod (QQ-T-580) with a specific heat treatment of 60–64 HRC hardness and a surface finish of R 16 µ in (0.40 µm) was applied to the outer surface of the tubular fabric with a total force of about 5 pounds. The abrasive force was then reciprocated longitudinally across the tubular product at a rate of about 200 cycles per minute through a total stroke of about 3 inches. In the test results, failure of the protective cover is established as a wearing through of the cover by the abrasion element. Such a failure is determined by the abrasive element contacting the metal reinforcement of the hose assembly after wear through of the fabric product, thus closing an electrical circuit which stops the tester.

COMPARATIVE EXAMPLE 1

A braided tubular product having an inner diameter of about 0.5 inch comprising polyester monofilament having a diameter of about 0.010 inch and a braid pattern of one over, one under was subject to an abrasion test according to the procedure described above. The tubular product was substantially circular in cross-section and had an inner diameter of about 0.5 inch. Such a product is generally available under the trade designation EXPANDO®. A series of three tests of the type described above were carried out. The results of this test are described in connection with Table 1 below.

TABLE 1

| Run # | Cycles to Failure |
| --- | --- |
| 1 | 13,800 |
| 2 | 9,700 |
| 3 | 14,600 |
| Avg. | 12,700 |

EXAMPLE 1

Woven tubular products according to the present invention were subjected to an abrasion test according to the procedure described above. The woven product comprised polyester monofilament fill threads having a diameter of about 0.009 inch and polyester monofilament warp threads having a diameter of about 0.010 inch in a 2—2 twill pattern. The tubular products were substantially circular in cross-section and had an inner diameter of about 0.5 inch. The fill threads were all resiliently set by the application of heat in the form of a substantially circular hoop having a diameter of about 0.52 inch. The warp threads were all resiliently set by the application of heat in a spiral configuration. The warp threads were all resiliently set in a spiral configuration. In a first product formed according to the invention (Product 1), the pitch was 0.2 turns per inch. In a second product of the invention (Product 2), the pitch was 0.125 turns per inch. A third product (Product 3) having a pitch of 0.1 turns per inch was also tested. The results of the tests are described in with Table 2 below.

TABLE 2

|  | Run # | Cycles to Failure |
|---|---|---|
| Product 1 | 1 | 56,500 |
|  | 2 | 50,400 |
|  | 3 | 62,600 |
|  | Avg. | 56,500 |
| Product 2 | Avg. of 8 runs | 56,300 |
| Product 3 | Avg. of 8 runs | 22,966 |

We claim:

1. A flexible abrasion and kink-resistant sleeve for protection of elongated articles, such as wires, cables, hoses and conduits, said sleeve comprised of warp and fill ends having an open weave construction characterized by the absence of supporting material for said warp and fill ends, said sleeve having a substantially circular cross-sectional configuration and an ARP abrasion resistance of at least about 20,000 cycles, said sleeve comprising:

at least one resilient filamentary fill end having a resilient set in a hoop configuration disposed in a plane extending substantially perpendicularly to the sleeve central axis; and at least one resilient filamentary warp end interwoven with said fill end, said warp end having a resilient set in a spiral configuration and having a pitch of from above about 0.1 to about 0.3 turns per longitudinal sleeve inch.

2. The sleeve of claim 1, wherein said filamentary fill end and said filamentary warp end each comprise a synthetic monofilament.

3. The sleeve of claim 1, wherein said sleeve is discontinuous in the circumferential direction thereby forming adjacent longitudinal edges that define a slit.

4. The sleeve of claim 1, wherein said fill ends and said warp ends each comprise filament formed of thermoplastic resin.

5. The sleeve of claim 1, wherein said filamentary fill end and said filamentary warp end each comprise a monofilament of thermoplastic resin selected from the group consisting of polyamides, polyesters and combinations of these.

6. The sleeve of claim 1, wherein said sleeve consists essentially of one or more of said filamentary fill ends and one or more of said filamentary warp ends.

7. The sleeve of claim 1, wherein said sleeve has a substantially circular cross-section with an inner diameter of from about 0.25 inch to about 4 inches.

8. A sleeve according to claim 3, wherein said adjacent longitudinal edges are in an overlapping relationship.

9. A sleeve according to claim 1, wherein the at least one warp end has a pitch of above about 0.125 turns per linear inch.

10. A flexible abrasion and kink-resistant sleeve for protection of elongated articles, such as wires, cables, hoses and conduits, said sleeve comprised of warp and fill ends having an open weave construction characterized by the absence of supporting material for said warp and fill ends, said sleeve having a substantially circular cross-sectional configuration and an ARP abrasion resistance of at least about 25,000 cycles, said sleeve comprising:

at least one resilient filamentary fill end having a resilient set in a hoop configuration disposed in a plane extending substantially perpendicularly to the sleeve central axis; and at least one resilient filamentary warp end interwoven with said fill end, said warp end having a resilient set in a spiral configuration.

11. A sleeve according to claim 10, wherein said at least one warp end has a pitch greater than about 0.125 turns per inch.

12. A sleeve according to claim 11, wherein said at least one warp end has a pitch not exceeding about 0.4 turns per inch.

13. A sleeve according to claim 12, wherein the pitch does not exceed about 0.3 turns per inch.

* * * * *